United States Patent [19]
Winkler

[11] Patent Number: 5,957,638
[45] Date of Patent: Sep. 28, 1999

[54] APPARATUS FOR MACHINING OF BAR MATERIAL, PROFILES AND THE LIKE

[76] Inventor: Siegbert Winkler, Haus Nr. 6, A-6600 Forchach, Austria

[21] Appl. No.: 08/795,310

[22] Filed: Feb. 4, 1997

[30] Foreign Application Priority Data

Feb. 4, 1996 [DE] Germany ............... 296 01 808 U

[51] Int. Cl.⁶ .................................................. B23B 41/00
[52] U.S. Cl. ........................ 409/198; 269/69; 408/89; 408/108; 409/221
[58] Field of Search ................ 408/89, 90, 103, 408/108; 409/164, 198, 221; 269/45, 69, 70

[56] References Cited

U.S. PATENT DOCUMENTS

| | | | |
|---|---|---|---|
| 1,498,660 | 6/1924 | Jeffrey | 408/108 |
| 2,651,975 | 9/1953 | Soloff | 408/89 |
| 3,371,580 | 3/1968 | Barnes et al. | 408/89 |
| 3,746,459 | 7/1973 | Kindelan | 408/89 |
| 3,918,145 | 11/1975 | Oglivie et al. | |
| 4,605,115 | 8/1986 | Genans | 408/103 |

FOREIGN PATENT DOCUMENTS

| | | |
|---|---|---|
| 0 442 160 | 8/1991 | European Pat. Off. . |
| 0 558 982 | 9/1993 | European Pat. Off. . |
| 2915380 | 10/1980 | Germany ............... 408/108 |
| 245103 | 4/1987 | Germany ............... 408/89 |
| 288908 | 12/1986 | Japan ............... 408/103 |

*Primary Examiner*—Daniel W. Howell
*Attorney, Agent, or Firm*—Jacobson, Price, Holman & Stern, PLLC

[57] ABSTRACT

Apparatus for the machining of bar material, profiles and the like comprises a rotation mechanism with a rotational drive. The rotation mechanism has a workpiece holder which holds the workpiece, and the said workpiece holder rotates about an axis parallel to the longitudinal axis of the workpiece.

15 Claims, 5 Drawing Sheets

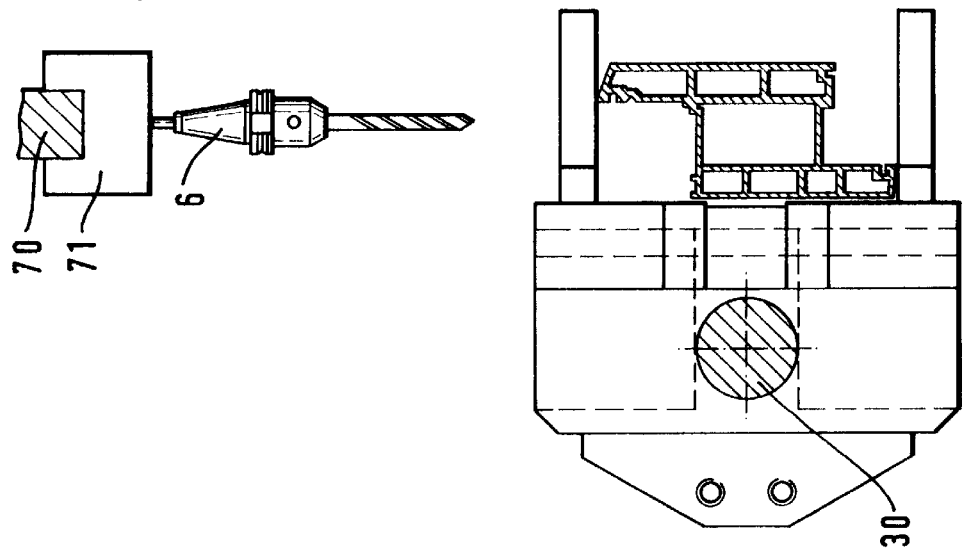
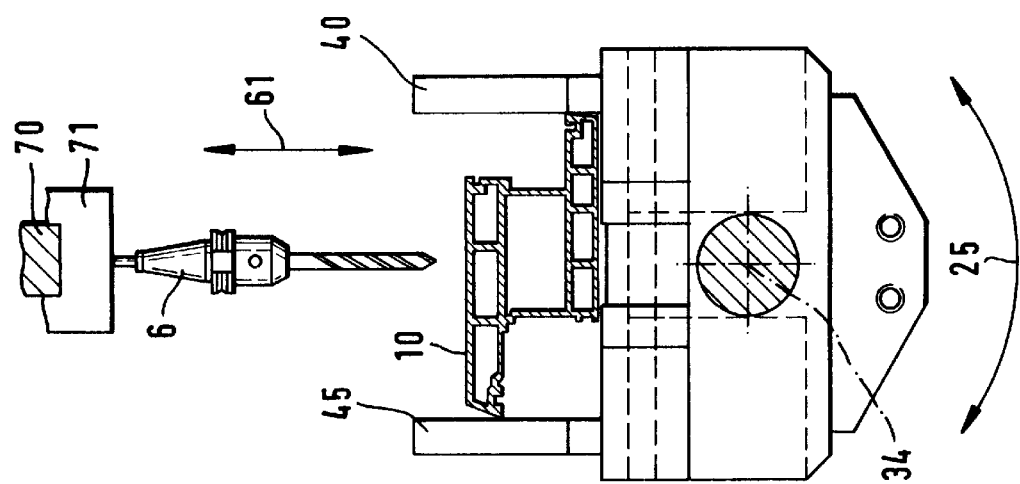
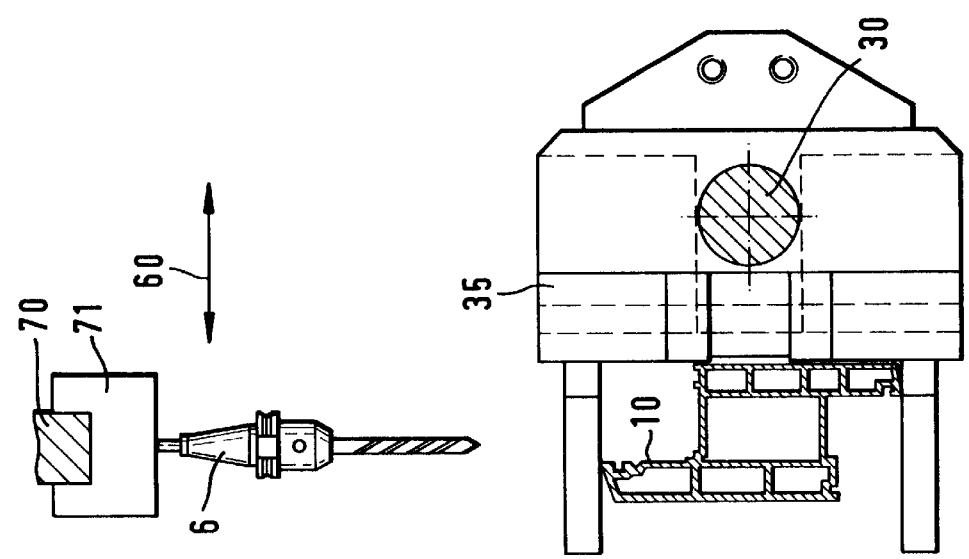

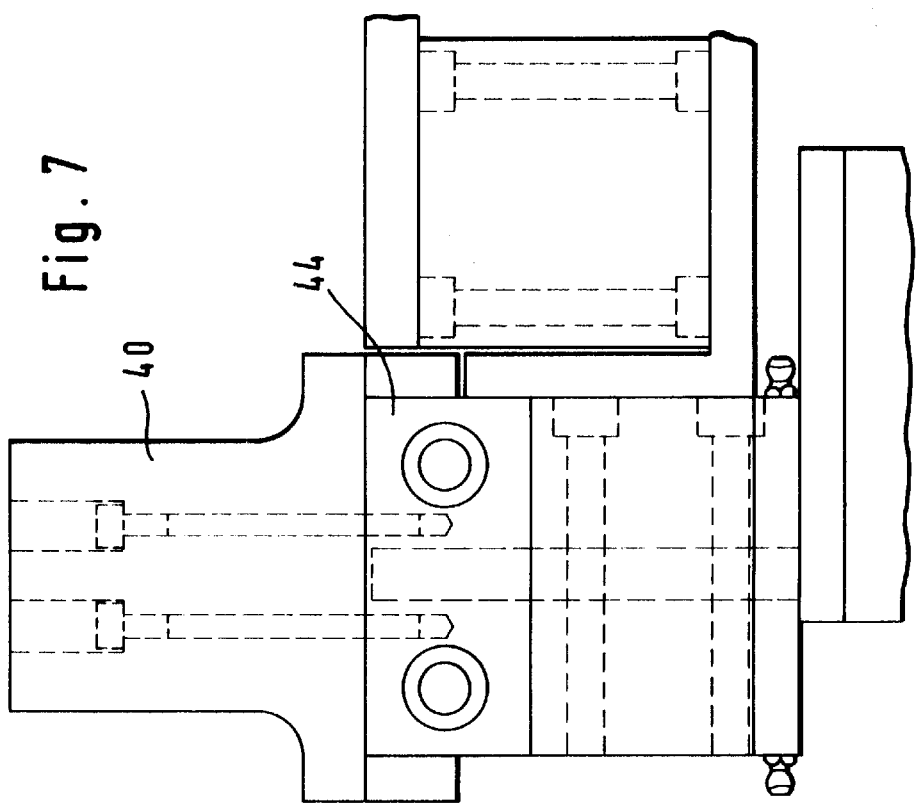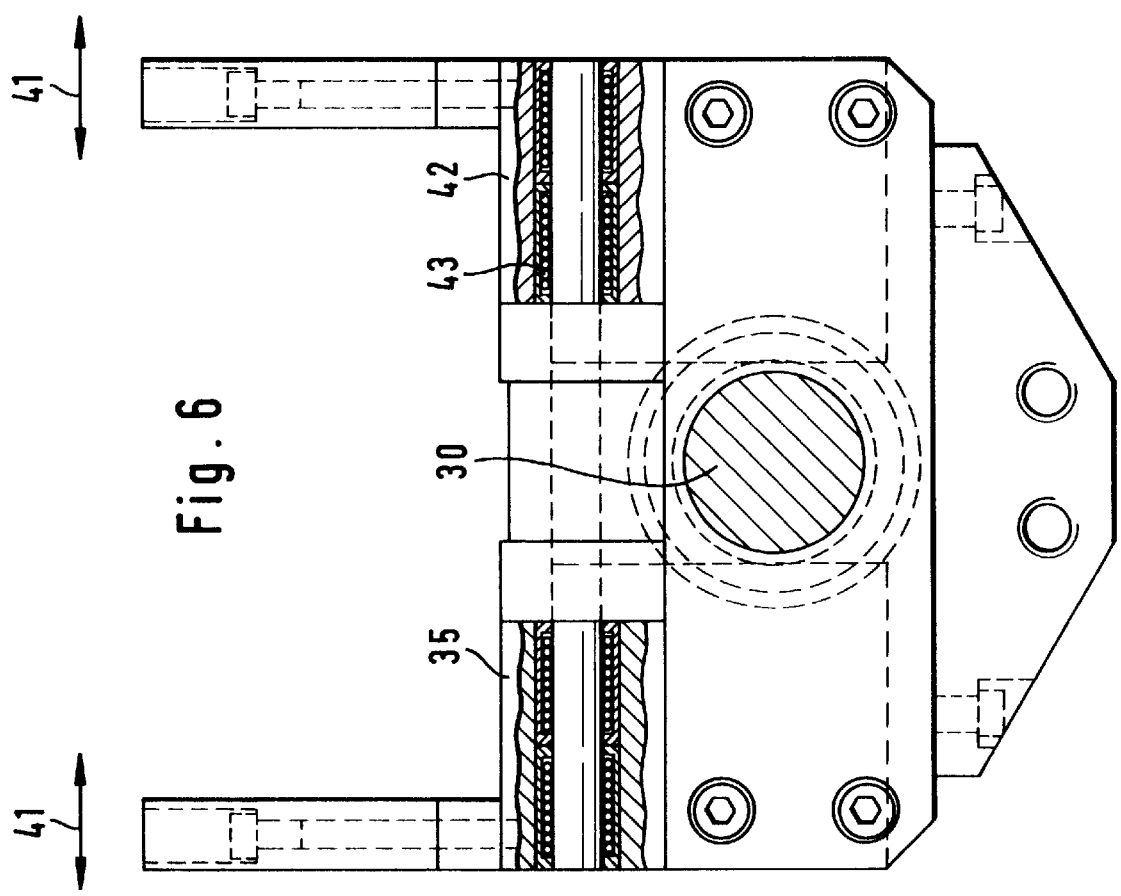

APPARATUS FOR MACHINING OF BAR MATERIAL, PROFILES AND THE LIKE

BACKGROUND OF THE INVENTION

1. Field of the Invention

The invention concerns apparatus for machining of bar material, profiles and the like.

2. Description of the Prior Art

Machines are known in which a profile to be machined is clamped on a machine table. The profile, which may for example be of plastic, wood or metal, and may be a pressed bar or an extrusion, is then processed or machined. Preparatory work must usually be carried out on the profiles. For example, they may be used to make windows, in which case cut-outs must be provided to allow the introduction of fittings, drive mechanisms or the like.

Furthermore, in the case of a metallic section to be used for facade construction, it may be necessary to attach additional components, and these may be welded on using the aforementioned apparatus.

When such bar material is to be machined, a problem frequently encountered is that it has to be machined on a number of different sides. To enable this to be done, it is known for the tool support to be designed so that it can rotate, making it possible to machine the workpiece on several sides. Such a design, however, is expensive since the tool supports, in particular tool spindles, must operate with high precision and the associated rotation mechanism must accordingly also be of high quality.

SUMMARY OF THE INVENTION

The object of the present invention is to provide apparatus for the machining of bar material or the like, by which the material can be machined on several sides at will, and which can be operated simply and reliably.

To solve this task, the invention takes as its starting point a mechanism of the type described above, and proposes that a rotation mechanism with a rotation drive system is provided, which engages with a workpiece holder that holds the workpiece and swings the said workpiece holder about an axis parallel to the longitudinal axis of the workpiece.

The arrangement according to the invention makes it possible to machine the workpiece on several sides. For example, when one side of a four-sided workpiece is to be visible, it suffices for the mechanism to rotate through 180°. Needless to say, any other desired workpiece shape can also be dealt with, by choice of an appropriate rotation range for the apparatus.

The invention eliminates the need for expensive mounting and rotation of tool spindles on bearings, and tool spindles of correspondingly expensive design are no longer required.

It is particularly advantageous for the workpiece holder to be in the form of a shaft to which a workpiece clamping device is attached. The shaft lies parallel to the longitudinal axis of the workpiece. The rotation drive engages or example with the shaft, such that the end-face of the workpiece can be machined without problems. When machining the end-face, for example the cut end of the workpiece, milled slots etc. can be formed without having to remove the workpiece from the mechanism.

It is also possible, however, for the longitudinal axis of the workpiece itself to be the rotation axis of the mechanism. In a design of this type the workpiece can be held, for example, at its end and can then be machined on all sides without problems.

It is also advantageous for the shaft to be made in two parts and for these two shafts to be connected by a clamping fixture. Such a design makes it possible to process short workpieces as well, without the shafts having to be of corresponding length. It is particularly difficult to manufacture long shafts of high quality. More especially, it is envisaged that the invention will enable machining of material lengths greater even than six metres. Thanks to the two-part shaft, by which a modular structure can in principle be achieved, the mechanism can easily be adapted to the corresponding material lengths. To transfer the weight of the shaft, and consequently too the forces that occur during machining, to the machine frame via the workpiece holder, a number of bearings are provided. These bearings also support the clamping fixture located between the shafts. A solid connection is also provided between the two parts of the shaft, as well as a mutually independent drive for each shaft.

Additionally, it is convenient for the equipment to incorporate a locking system to lock the workpiece holder in place. The locking system makes it possible to hold the rotated workpiece holder firmly in the desired angular position without coming out of adjustment during machining. To this end, the locking system comprises means by which sufficient locking force is applied to prevent the machining forces acting on the workpiece from causing any undesired rotation of the workpiece holder.

In a preferred embodiment of the invention, a locking pin can be inserted into the mechanism. For example, a locking disc has openings around its circumference into which the locking pin can be pushed by a pneumatically operated piston. The locking pin can for example be located on the machining table.

It is particularly appropriate for the locking system to be located at the end of the shaft, though of course locking can be provided in the middle part of the shaft. It is easier to replace the locking system, especially the locking disc, when this is located at the end of the shaft. For example, the locking disc can have slots cut at various angles. In this regard, it is convenient for the openings to be positioned 90° apart from one another, for example radially or parallel to the shaft. This allows locking in positions corresponding to the sides of a four-sided workpiece.

It is advantageous to provide a servomotor as the rotation drive motor, since a servomotor allows continuous adjustment of the rotation mechanism through any angle. In this case, the rotation drive system can engage with both ends of the shaft and have a corresponding synchronized control mechanism. With the use of a servomotor, two different but supplementary effects can be obtained. On the one hand, the servomotor permits uniform movement, which makes it possible to machine the workpiece in a corresponding way. On the other hand, the servomotor can be used to set the workpiece in any desired position relative to the machining units. For that purpose, the servomotor comprises a corresponding brake or locking system to hold the selected position firm and allow machining without problems. For example, the servomotor can be directly coupled to the shaft, or it can act on the shaft via a toothed belt. Geared motors or suchlike can be provided as additional rotation drives.

Furthermore, it is convenient to provide a machining unit which can machine the sides and/or end-faces of the workpiece. The machining unit, for example a tool spindle with attachments for drilling or milling, or an automatic machining unit or the like, can be fitted so that it can move in the longitudinal direction parallel to the axis of the workpiece (X-axis). At the same time, the machining unit can also be moved in the direction of the Y-axis, i.e. in a perpendicular plane. This allows it to reach the various rotation positions where the workpiece comes to rest.

An angle drive on the machining unit allows the end-faces of the section to be machined as well.

It is advantageous for the machining unit to machine the workpiece during the rotational movement of the rotation drive. This makes it possible to carry out elaborate machining operations on the section without having to provide another machining unit for that purpose. In particular, milling operations at the circumference of the section, or the like, can be carried out easily.

The invention also envisages that the workpiece clamping device should comprise a clamping slide-carriage that can move along the shaft. This makes it possible to carry out, even on clamped workpieces, machining operations which would otherwise be interfered with by the workpiece clamping device, for example because the workpiece has been clamped at a point where machining is to take place. For this, it is not necessary to take off and move the whole workpiece, but only to release the clamping device that is in the way and move it elsewhere. The workpiece is released and the clamp holding the workpiece clamping device in place is loosened so that the latter can be pushed along the shaft.

It is also convenient for the workpiece clamping device to comprise clamping jaws that grip the workpiece at the sides like a vice. Such a design can be made simply and effectively. The clamping jaws can, for example, be activated pneumatically or hydraulically. Depending on the application, this allows various pressures to be exerted on the clamping jaws, so that the holding forces can be varied accordingly, a particular advantage when different materials (metal or plastic) are being processed.

Further, it is provided that the two clamping jaws move the same distance when gripping the workpiece, so that the latter will be held centrally when clamped. When a workpiece is to be machined, it is advantageous to define its axes. For this, it is provided in particular that the longitudinal axis of the workpiece, its axis of symmetry for example, will be directly over the shaft in the clamped position. Movement of the clamping jaws through an equal distance ensures that the workpiece is centred, i.e. accurately aligned, when clamped. When machining is carried out automatically, this makes it possible to input the width of the workpiece to the control system in advance, and the machining unit or its computerized control system can then determine for itself the corresponding coordinates for the machining of the workpiece and accordingly machine it at the points required.

BRIEF DESCRIPTION OF THE DRAWINGS

FIG. 5a, 5b and 5c are views showing various positions of the workpiece clamping device and machining unit of the apparatus according to the invention;

FIG. 6 is a view in vertical section of a workpiece clamping device of the apparatus according to the invention; and FIG. 7 is a view of the workpiece clamping device of the apparatus according to the invention.

DETAILED DESCRIPTION OF THE INVENTION

Figure 1:
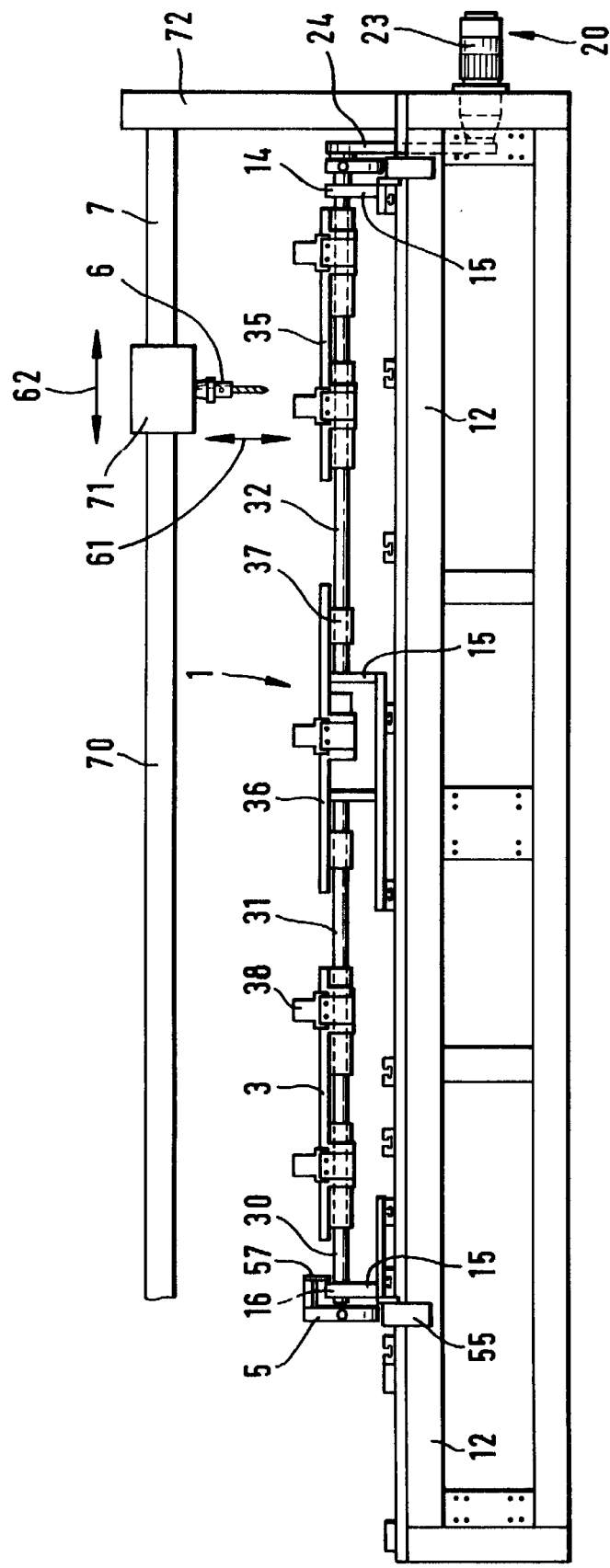
FIG. 1 is a side view of an apparatus according to the invention.
Figure 2:
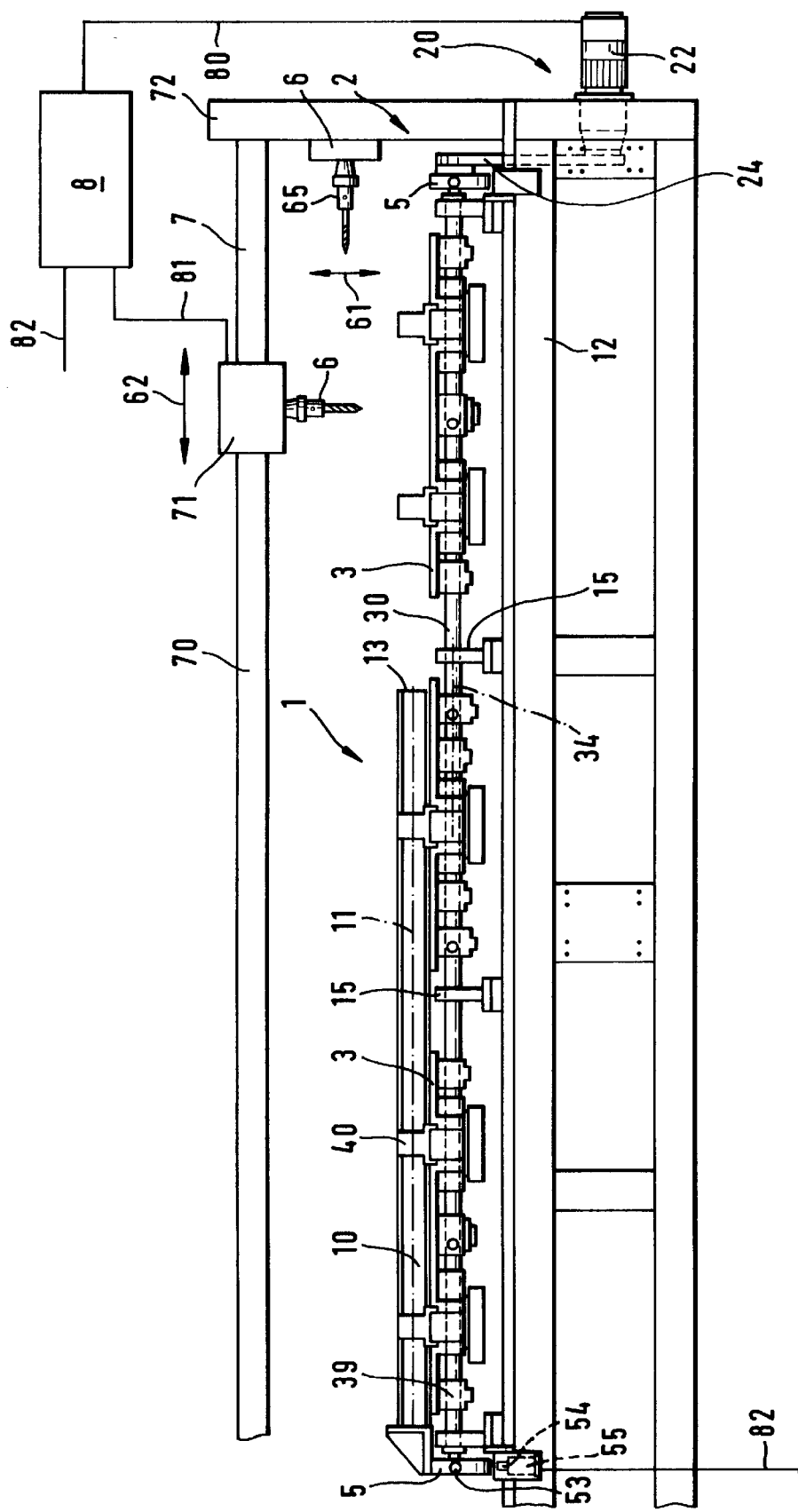
FIG. 2 is another side view of the apparatus according to the invention.
Figure 3:
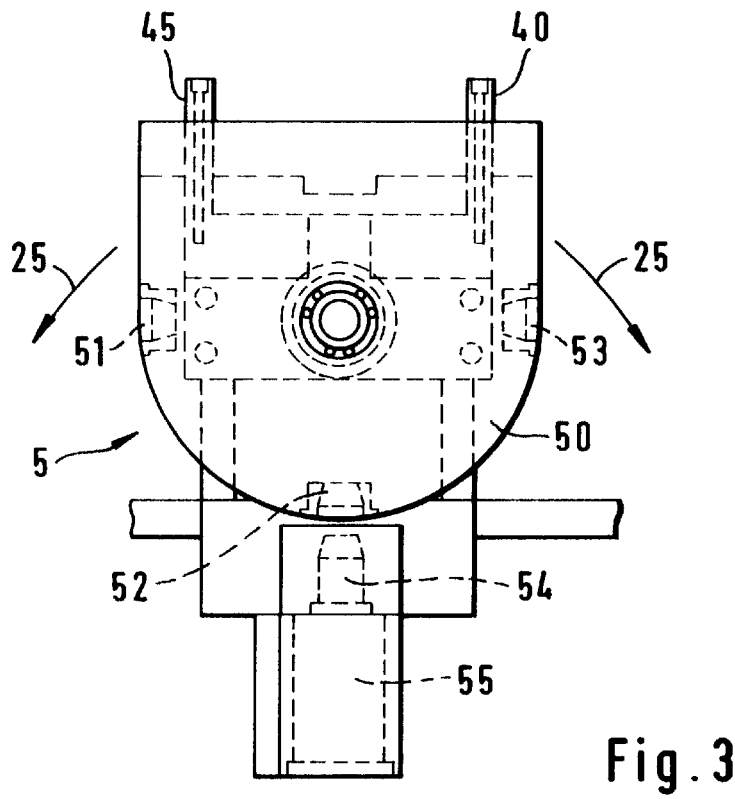
FIG. 3 is a view along the arrow III in FIG. 4.

Referring first to FIG. 1 and FIG. 2, an apparatus (1) for the machining of bar material (10) or the like comprises a machine table (12) on which a workpiece (10) is held with the aid of a workpiece holder (3). On the table (12) is also located a machining unit (6). The machining unit (6) may for example be a high-speed tool spindle, a milling cutter, a drill, a planing tool, or the like. The machining unit (6) can be moved parallel to the longitudinal axis (11) of the workpiece (10), along the X-axis. At the same time, the machining unit (6) can also move in the direction of the other two spatial axes, the Y-axis and the Z-axis. This allows the machining unit (6) to be positioned at any height or depth. For example, the machining unit (6) can also be designed to tilt, or it may comprise an angle drive, enabling it to machine the end-face (13) of the workpiece (10).

FIG. 1 shows that the workpiece holder (3) consists of a shaft in two parts (31, 32). This two-part structure of the shaft has the advantage that relatively short shafts can be made quite simply and a number of such shafts can then be combined to form a long workpiece holder. This imparts great flexibility to the mechanism, and the production of short shafts is also simpler and cheaper. In the present case, a number of shafts are arranged in a line.

By means of a clamping fixture (36), the two shafts (31, 32) are firmly connected to one another.

On the machine table (12) several supports (15) are provided, which hold bearings (14) in which the shaft (30) rests. The clamping fixture (36) is connected to the shaft by means of a spindle bracket (37).

As shown in FIG. 1, at each end the section holder has a locking system (5). This makes it possible to fix the workpiece holder (3), for example the shaft (30), in an optimum rotated position.

The utility of the mechanism is increased still further when, for example, not just one workpiece holder (3) but several of them are provided on a single machine table (12). This gives the advantage that a machining unit (6) can be provided which interacts with two section holders (3). This makes it possible, to operate in such a way that the workpiece on the right-hand holder is being changed while the machining unit (6) works on the workpiece on the left-hand holder. The high cost of the tool spindle, especially a high-speed spindle, is thereby put to optimum use in the apparatus according to the invention.

Figure 4:
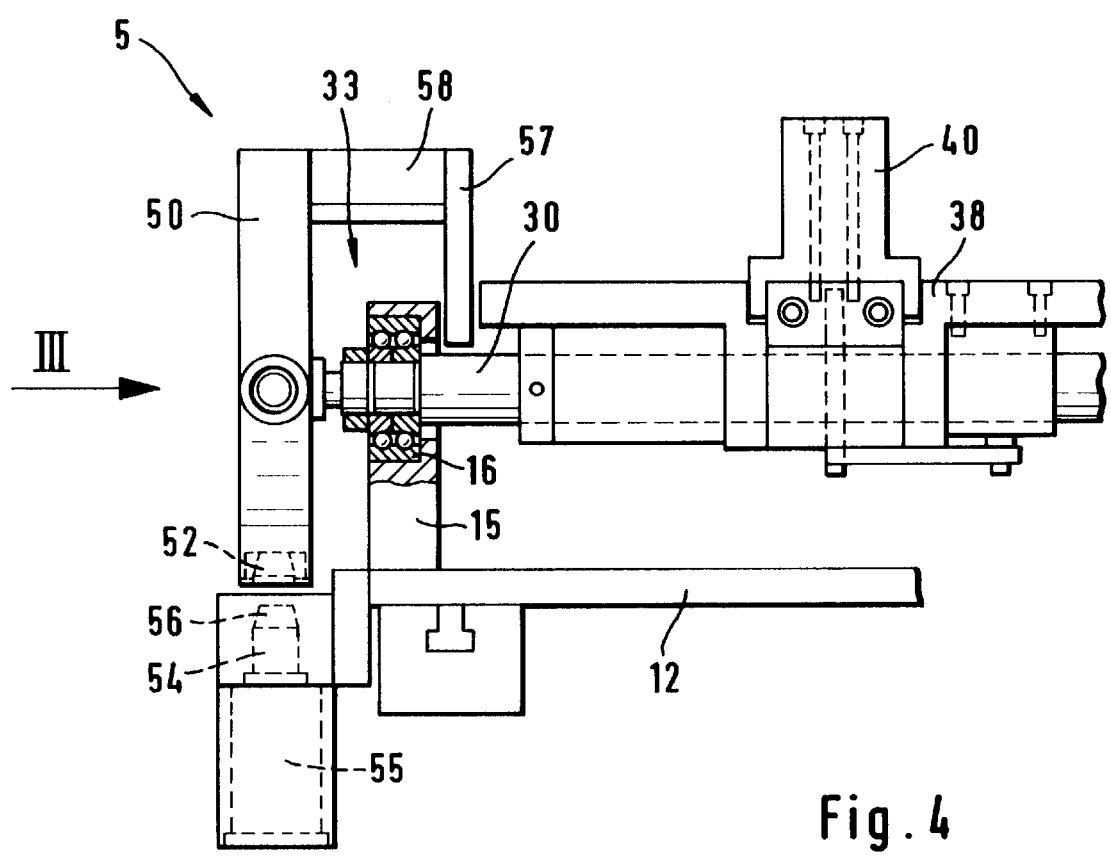
FIG. 4 is a detailed view of the apparatus according to the invention, seen from the side.

FIG. 4 shows details of the end of the workpiece holder with the locking system (5). The locking system (5) is fitted at the end of the shaft (30), and consists of a locking disc (50) pushed over the end of the shaft (30). The locking disc (50) is, for example, circular. However, it could also be formed as a half-disc at the top of which a strut (58) or support is positioned at right-angles to the disc, as illustrated in FIG. 4. With such a design, the locking disc (50) can then also act as an end-stop (57) for the workpiece (10) held on the clamping slide-carriage (38), with the strut (58) supporting the end-stop (57).

In another embodiment it is appropriate to provide an end-stop that can be lowered out of the way, especially when the workpiece has to be machined at the end. In this case the plane in which the workpiece rests on the clamping device is higher than the locking mechanism, in particular the locking disc.

The end-stop (57) is connected to the disc (50) by a strut (58). With its strut (58), the end-stop (57) spans across the end-bearing (16) and its support (15), in which the shaft (30) is mounted. As shown in FIG. 4, the end-stop (57) is positioned upright almost over the shaft (30). This design of the end-stop, together with the strut (58), provides a cover for the end-bearing (16), which is advantageous because the apparatus according to the invention can be used for operations which produce shavings as well, and the arrangement described provides an optimum way to prevent dirt from entering the area concerned.

The invention provides various different possible designs for the locking system. Firstly, locking can be achieved by means of a locking-pin (54) that is pushed into the disc. Furthermore, to achieve continuous adjustment, a servomotor (22) can be fitted to drive the rotation system (20), the said motor having a corresponding brake or coupling to hold the rotated section holder in the desired position. Alternatively, the shaft (30) or the workpiece holder (3) can be splined at the end, and the splines held fast by a corresponding setting of the locking system.

When the locking system (5) consists of a locking disc (50), the disc (50) has radial openings (51, 52, 53) into which a locking pin (54) can be pushed. The locking pin (54) is activated by a working cylinder (55), which could for example be a pneumatic cylinder or an electrical drive. In this arrangement the pin (54) or the working cylinder (55) could be fitted on the machine table. The pin (54) has a conical tip (56). This facilitates its entry into the openings (51, 52, 53) to ensure a stable mechanical connection between the disc and the machine table (12).

The invention proposes that the openings (51, 52, 53) are spaced 90° apart around the circumference of the disc (50). Such a design makes it easy to process the clamped workpiece or bar material on three sides. By an appropriate choice of the openings (51, 52, 53) relative to additional openings, it is easy to produce any other angular setting. An axial locking system can also be proposed, in which the pin (54) is positioned in the axial direction relative to the shaft (30).

It is also envisaged that the locking system (5) could consist of a servomotor 22. Such a design is particularly advantageous when a variety of angular settings are desired. Servomotors (22) are then provided at both ends of the workpiece holder (3) to hold the workpiece in the optimum way. The servomotor (22) comprises a brake or coupling such that the setting chosen can be held securely. To ensure uniform driving of the workpiece holder's rotation, the control system acts on both servomotors engaged-with the workpiece holder (3), to ensure uniform movement and locking of the servomotor.

FIG. 4 shows the clamping slide-carriage (38), which is positioned above the shaft (30). The carriage (38) is clamped onto the shaft (30) so that when the latter rotates, the carriage (38) turns with it. The slide-carriage (38) is supported on the shaft (30) by a linear bearing (39). Consequently, the slide-carriage (38) can be moved along the guide shaft (30) by hand or pneumatically, and fixed in any desired position on the shaft (30). This is particularly advantageous when the workpiece is to be machined at points that would otherwise be covered by the clamping jaws (40).

FIGS. 5a, 5b and 5c show the apparatus according to the invention in three different rotational positions. The rotation mechanism (2) swings the workpiece holder (3) about an axis parallel to the longitudinal axis of the bar material (10). The workpiece holder (3) is rotated around the axis (34) of the shaft (30). The rotary movement is indicated by an arrow (25). The machining unit (6) carries out machining operations on the workpiece (10). The machining unit (6) can move in at least the three spatial axes X, Y and Z. The X-axis (double-arrow (62)) is defined by the direction of the axis (34) or the longitudinal axis (11) of the bar material (10). The Y-axis is vertically perpendicular to the X-axis, and is designated by the double-arrow (60). Movement in the Z direction (arrow 61) permits easy height adjustment. FIG. 5c shows that relative to the position in FIG. 5a, the machining unit (6) has been moved along the axis (34) to the right.

A positioning unit (7) is provided to enable movement of the machining unit (6) along the three spatial axes X (62), Y (60) and Z (61). This positioning unit (7) consists of a track (70) essentially parallel to the longitudinal axis (34) of the shaft (30) of the workpiece holder (3). On this track (70) there is a slide-carriage (71) carrying the machining unit (6). The carriage (71) includes the drive unit for the machining unit (6) and a height adjustment system (Z-axis) for the said unit or an adjustment (Y-axis) transverse to the longitudinal axis (34) of the shaft (30). However, the positioning unit (7), which is located above the machining table (12), can also be arranged so as to move or be driven transversely to the length of the workpiece. The track (70) is supported by a strut (72), such that the machining unit (6) can for example machine the workpiece from above. Provision is also made on the strut (72) for another machining unit (65) to be used if desired, for example to machine the end-face of the workpiece. The machining unit (65) may if desired have a drive in the X-direction (62).

Such an arrangement presents no difficulties, because the machining unit (6) is as a rule at least a 3-axis tool spindle. However, the invention eliminates the need for more elaborate and expensive movement systems for the tool spindle with a view to machining the bar material on as many sides as possible.

FIG. 6 shows a partial section of the workpiece clamping device (35). The workpiece clamping device (35) is mounted on the shaft (30). To clamp the workpiece (10), clamping jaws (40, 45) are provided which grip the workpiece at the sides like a vice.

For central clamping of the workpiece, it is envisaged that the clamping jaws (40, 45) move an equal distance. A common drive is provided to move the two jaws (40), whose motion is indicated by the double-arrow (41).

For this, a pneumatically or hydraulically activated cylinder engages with a draw-plate. This draw-plate has slideways for the two clamping jaws (40, 45). Sliding blocks attached to each of the jaws engage with the respective slideway. When the working cylinder is activated, the drawplate moves and causes the clamping jaws (40, 45) to move as indicated by the arrow (41). To allow the jaws (40, 45) to move, they are supported by a bearing on the clamp saddle (42). The bearing in question is designated (43).

To allow machining of various workpiece sizes, provision is made to activate the clamping jaws (40) from various starting positions. For this, the jaws (40) are mounted on an adjustment carriage, the said carriage incorporating the slideways for the sliding guide system. The clamping jaws can for example be bolted onto the adjustment carriage. The carriage comprises catches fitted a shorter distance apart than the maximum clamping range of the clamping jaws. This allows any size of workpiece between a minimum and a maximum dimension to be gripped. The clamping jaws can for example be activated pneumatically or hydraulically by the aforementioned working cylinder. Pneumatic activation may be sufficient when plastic sections are being processed, since when these are machined the forces involved are smaller than when metal is machined. Where high loads are involved, hydraulic activation is provided. For this, the working cylinder can be activated in either direction, namely either to close or to open the clamping jaws.

The rotary drive (20) can also be a geared motor (23) which acts on the shaft (30) via a toothed belt or V-belt (24).

To monitor the movement of the machining unit (6) a control unit (8) is provided. For this, the machining unit (6) is connected to the control unit (8) via a data cable (81). The control unit (8) determines the machining position, i.e. the coordinates along the movement axes, in this case the three spatial axes. In addition, the control unit (8) is connected to the rotation drive, i.e. the servomotor (22) or geared motor (23), and regulates the rotation of the workpiece. A data cable (82) connects the control unit (8) to the locking system (5). Before the workpiece is rotated for a new machining operation, the locking system is released via this data cable so that the rotation mechanism (2) can rotate the workpiece (10). When the rotation has been completed, the locking system can again be operated or, if a servomotor (22) is in use, a corresponding brake or coupling can be activated. When the workpiece has been rotated, the control unit (8) notes the new working coordinates, for example the workpiece size and rotation angle, and converts this information to new machining coordinates for the workpiece, to determine the new working position of the tool spindle or suchlike.

In a further embodiment of the invention, the mechanism comprises a machining table and the rotation mechanism is mounted on this machining table. With this design the utility of existing machine tools, machining centres or other mechanisms as described can be enhanced simply and effectively. For example, the rotation mechanism can be mounted on the baseplate of the machining table. For this, the rotation mechanism comprises, for example, connections for energy-supply and control cables that allow problem-free integration into the equipment. The control cable can for example be used to transmit the signals for the rotation of the workpiece.

The workpiece can be rotated through up to 360°.

I claim:

1. Apparatus for the machining of a workpiece, said apparatus comprising
   a workpiece holder which, in use, supports the workpiece, the workpiece holder comprising a shaft which supports a workpiece clamping mechanism, and
   a rotation mechanism including a rotational drive which engages said workpiece holder to swing said workpiece holder about an axis parallel to a longitudinal axis of the workpiece.

2. Apparatus for the machining of a workpiece, said apparatus comprising
   a workpiece holder which, in use, supports the workpiece,
   a rotation mechanism including a rotational drive which engages said workpiece holder to swing said workpiece holder about an axis parallel to a longitudinal axis of the workpiece, and
   a locking system that fixes the workpiece holder in place, said locking system including a locking disc with openings into which a locking pin can be inserted.

3. Apparatus according to claim 1, wherein said shaft comprises a plurality of shaft parts connected together by a clamping fixture.

4. Apparatus as claimed in claim 1, wherein said shaft includes two shaft parts connected together by a clamping fixture.

5. Apparatus according to claim 1, further comprising a locking system that fixes the workpiece holder in place.

6. Apparatus according to claim 5, wherein said locking system comprises a locking disc with operings into which a locking pin can be inserted.

7. Apparatus according to claim 5, wherein said workpiece holder comprises a shaft and said locking system is fitted at an end of said shaft.

8. Apparatus according to claim 5, wherein said locking system comprises a locking disc with openings positioned at intervals of 90° from one another.

9. Apparatus according to claim 1, wherein said rotational drive is a servomotor.

10. Apparatus according to claim 1, wherein a machining unit is provided to machine at least one of sides and end-faces of the workpiece, such that the machining unit can move parallel to at least one of the longitudinal axis of the workpiece and in a plane essentially perpendicular to said axis.

11. Apparatus according to claim 1, wherein the workpiece clamping mechanism comprises a clamping slide-carriage that can be moved along said shaft.

12. Apparatus for the machining of a workpiece, said apparatus comprising
    a workpiece holder which, in use, supports the workpiece,
    a rotation mechanism including a rotational drive which engages said workpiece holder to swing said workpiece holder about an axis parallel to a longitudinal axis of the workpiece, and
    a locking system that fixes the workpiece holder in place, said workpiece holder including a shaft and said locking system being fitted at an end of said shaft.

13. Apparatus according to claim 1, wherein the workpiece clamping mechanism comprises two clamping jaws which describe equal clamping movements to hold the workpiece in a centred position.

14. Mechanism according to claim 1, which comprises a machining table, and in which said rotation mechanism can be mounted on said machining table.

15. Apparatus for the machining of a workpiece, said apparatus comprising
    a workpiece holder which, in use, supports the workpiece,
    a rotation mechanism including a rotational drive which engages said workpiece holder to swing said workpiece holder about an axis parallel to a longitudinal axis of the workpiece, and
    a locking system that fixes the workpiece holder in place, said locking system including a locking disc with openings positioned at intervals of 90° from one another.

* * * * *